United States Patent
Roehrs et al.

(12) 
(10) Patent No.: US 6,648,521 B2
(45) Date of Patent: Nov. 18, 2003

(54) SINGLE TERMINUS CONNECTOR WITH PRETERMINATED FIBER AND FIBER GUIDE TUBE

(75) Inventors: Daniel C. Roehrs, McKinney, TX (US); Vincent A. Wouters, Celina, TX (US)

(73) Assignee: Fiber Systems International, Richardson, TX (US)

( * ) Notice: Subject to any disclaimer, the term of this patent is extended or adjusted under 35 U.S.C. 154(b) by 72 days.

(21) Appl. No.: 10/080,320

(22) Filed: Feb. 21, 2002

(65) Prior Publication Data

US 2002/0118928 A1 Aug. 29, 2002

Related U.S. Application Data

(60) Provisional application No. 60/271,014, filed on Feb. 23, 2001.

(51) Int. Cl.[7] ............................................. G02B 6/38
(52) U.S. Cl. ............................ 385/84; 385/60; 385/66; 385/78; 385/80
(58) Field of Search ..................... 385/60, 62, 66, 385/68, 70, 72, 80, 81, 84

(56) References Cited

U.S. PATENT DOCUMENTS 4,877,303 A * 10/1989 Caldwell et al. ............... 385/55
6,022,150 A * 2/2000 Erdman et al. ................. 385/81
6,068,410 A * 5/2000 Giebel et al. ................... 385/72
6,485,191 B1 * 11/2002 Sato ............................... 385/73

OTHER PUBLICATIONS

Siecor, No–Epoxy/No–Polish Fiber Optic Connectors Unicam Multimode Connectors, Apr. 1997, 2 pages.
Corning Cable Systems LLC, No Epoxy/No Polish Fiber optic Connectors, Jul. 2000, 2 pages.

* cited by examiner

Primary Examiner—Hemang Sanghavi
(74) Attorney, Agent, or Firm—Howison & Arnott, L.L.P.

(57) ABSTRACT

A fiber optic connector has a preterminated fiber mounted within a ferrule and a fiber guide tube for guiding a terminating fiber into the ferrule to optically coupled the terminating fiber to the preterminated fiber, with an index matching gel extending between the terminating fiber and the preterminated fiber. An index matching gel is initially disposed on an end face of the preterminated fiber and inside of the fiber guide tube. The index matching gel is placed on an end face of the terminating fiber by passing the terminating fiber through the fiber guide tube, with a portion of the gel being wiped free of the terminating fiber periphery as the fiber enters the ferrule. A window extends through a sidewall of the fiber guide tube for applying an adhesive to secure the terminating fiber to the connector. An light signal is applied to the preterminated fiber as the terminating fiber is being connected to the preterminated fiber, to provide a positive indication which verifies when the two fibers are optically connected.

6 Claims, 12 Drawing Sheets

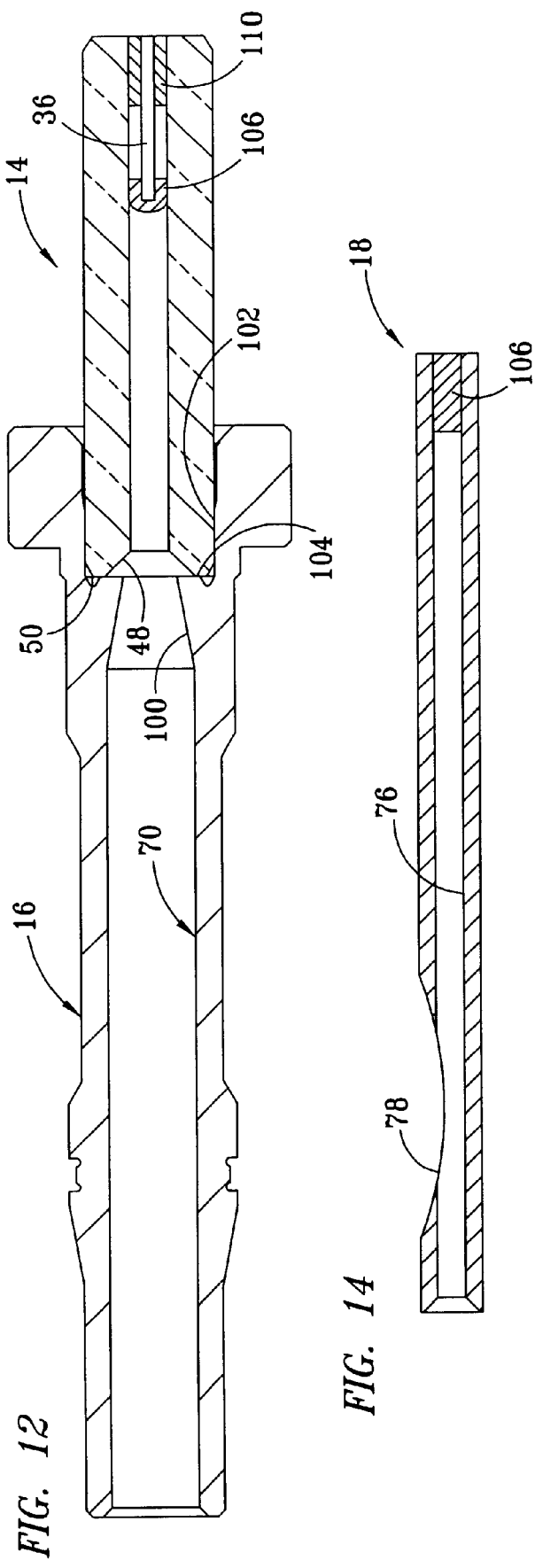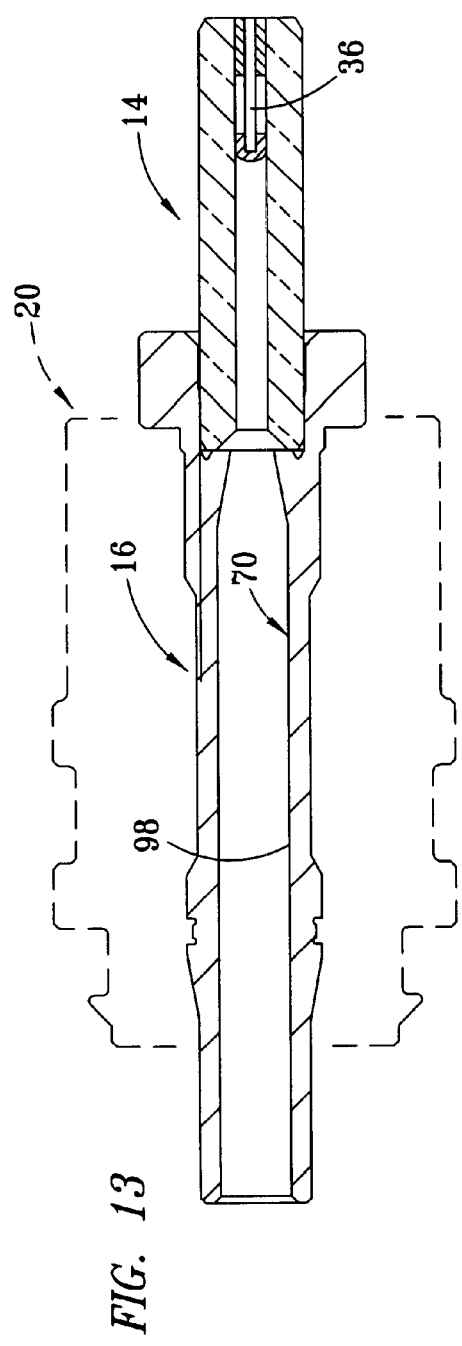
FIG. 12
FIG. 14
FIG. 13

SINGLE TERMINUS CONNECTOR WITH PRETERMINATED FIBER AND FIBER GUIDE TUBE

CROSS-REFERENCE TO RELATED APPLICATIONS

This application claims priority to provisional U.S. Patent Application Serial No. 60/271,014 (Atty. Dkt. No. FBSI-25, 605) entitled "SINGLE TERMINUS CONNECTOR WITH PRETERMINATED FIBER AND FIBER GUIDE TUBE," filed Feb. 23, 2001.

TECHNICAL FIELD OF THE INVENTION

This invention relates to fiber optic connectors, and in particular, to a fiber optic connector having preterminated fibers and a single terminus connector.

BACKGROUND OF THE INVENTION

Prior art connectors have been provided for field use to connect optical fibers such that light signals may be transmitted between mated connectors. Typically, each optical fiber was installed into termini which comprises a ferrule and pin body, with the ferrule being mounted to the forward end of the pin body. The optical fiber was inserted through the ferrule and adhesively secured therein. After insertion, the optical fiber being terminated would have to be polished at the forward face of the ferrule for mating with an optical fiber extending to the forward face of the ferrule of a mating connector. Polishing of the terminal ends of the terminating fibers was required for optically coupling the fibers together to transmit light signals therebetween without excessive losses in signal strength.

Other fiber optic connectors have been provided which contain fibers which are factory preterminated. Such connectors require that terminating fibers be mated to the rearward end of the preterminated fibers, and the terminating fibers are then mechanically secured within the connectors. However, such connectors do not provide a means of visually verifying that the terminating fibers have been successfully coupled with the respective ones of the preterminated fiber as the terminating fiber is being made up with the connector.

SUMMARY OF THE INVENTION

A single terminus fiber optic connector is provided having a preterminated fiber and a fiber guide tube for guiding a terminating fiber into the connector in alignment with the preterminated fiber. An index matching gel is disposed on the rearward end of the preterminated fiber and in the forward end of a bore of a fiber guide tube. A rearward section of the fiber guide tube has a window which extends from a periphery defined by a sidewall of the fiber guide tube, through the sidewall and into the bore of the fiber guide tube. An adhesive is applied through the window and onto the terminating fiber to secure the terminating fiber within the fiber guide tube once the terminating fiber is installed within the connector for mating with the preterminated fiber. The forward end of the fiber guide is preferably spaced apart from a rearward end of a ferrule which is mounted to the connector. The ferrule contains the preterminated fiber. The forward end of the ferrule and the preterminated fiber are factory polished prior to use in the field. The terminating fiber is mounted to the connector in the field. After field assembly, the terminating fiber extends into the rearward end of the ferrule and is optically coupled to the preterminated fiber by the index matching gel, which extends between the rearward end of the preterminated fiber and the forward end of the terminating fiber.

In another aspect of the present invention, a method is provided for optically coupling a terminating fiber with a preterminated fiber of a single terminus fiber optic connector. A fiber guide tube is provided for fitting within a rearward end of a pin body having a ferrule disposed in the forward end thereof. The preterminated fiber is factory installed into the ferrule. The preterminated fiber has an index matching gel on the rearward end face thereof, for optically coupling to the forward face of the terminating fiber. The terminating fiber has a terminal end portion which is first stripped of the outer buffer coating for a predetermined length, cleaved, and then is passed through the forward end of a bore in the fiber guide tube. The index matching gel is placed on a forward face of the terminating fiber as the terminating fiber is passed through the fiber guide tube. Upon entering the rearward end of a bore of the ferrule, at least a portion of the periphery of the forward terminal end of the terminating fiber is wiped free of any significant amounts of the index matching gel, such that air will escape from between the forward face of the terminating fiber and the rearward face of the preterminated fiber. The region between the forward and rearward faces of the respective terminating and preterminated fiber will be free of air, and filled with index matching gel to optically couple the terminating fiber to the preterminated fiber. An light signal is applied to the preterminated fiber as the terminating fiber is being connected to the preterminated fiber, to provide a positive indication which verifies when the two fibers are optically connected.

BRIEF DESCRIPTION OF THE DRAWINGS

For a more complete understanding of the present invention and the advantages thereof, reference is now made to the following description taken in conjunction with the accompanying Drawings in which:

FIGS. 12–15 are longitudinal sections views of the various components of the single terminus connector being factory assembled to provide the single terminus connector for use in the field;

DETAILED DESCRIPTION OF THE INVENTION

Figure 1:
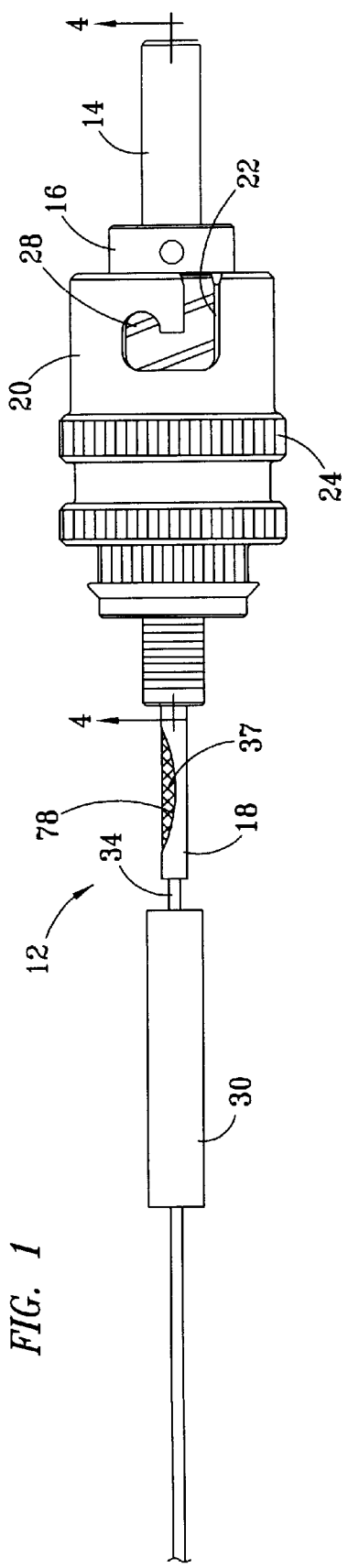
FIG. 1 is a side elevation view of a single terminus connector made according to the present invention.

FIG. 1 is a side elevation view of a single terminus connector 12 which has been field installed onto a terminating fiber 34. The connector 12 includes a ferrule 14 made of ceramic, preferably of zirconia. The connector 12 further includes a pin body 16 having a guide tube 18 which extends therefrom. A coupling sleeve 20 is mounted to the exterior of the pin body 16 and includes a J-latch groove 22. The coupling sleeve 20 further has a knurled exterior 24. A lock ring 26 (shown in FIG. 2) secures the coupling sleeve 20 to the pin body 16. A bias means is provided by a coil spring 28 which urges the coupling sleeve 20 toward the rearward end of the pin body 16. A strain relief tube 30 is provided for preventing the terminated fiber ("T-fiber") 34 from bending beyond a minimum bend radius. The single terminus connector 12 further includes a preterminated fiber ("P-fiber") 36 (shown in FIG. 4) which is mounted and bonded within the ferrule 14 for optically coupling to the T-fiber 34.

Figure 2:
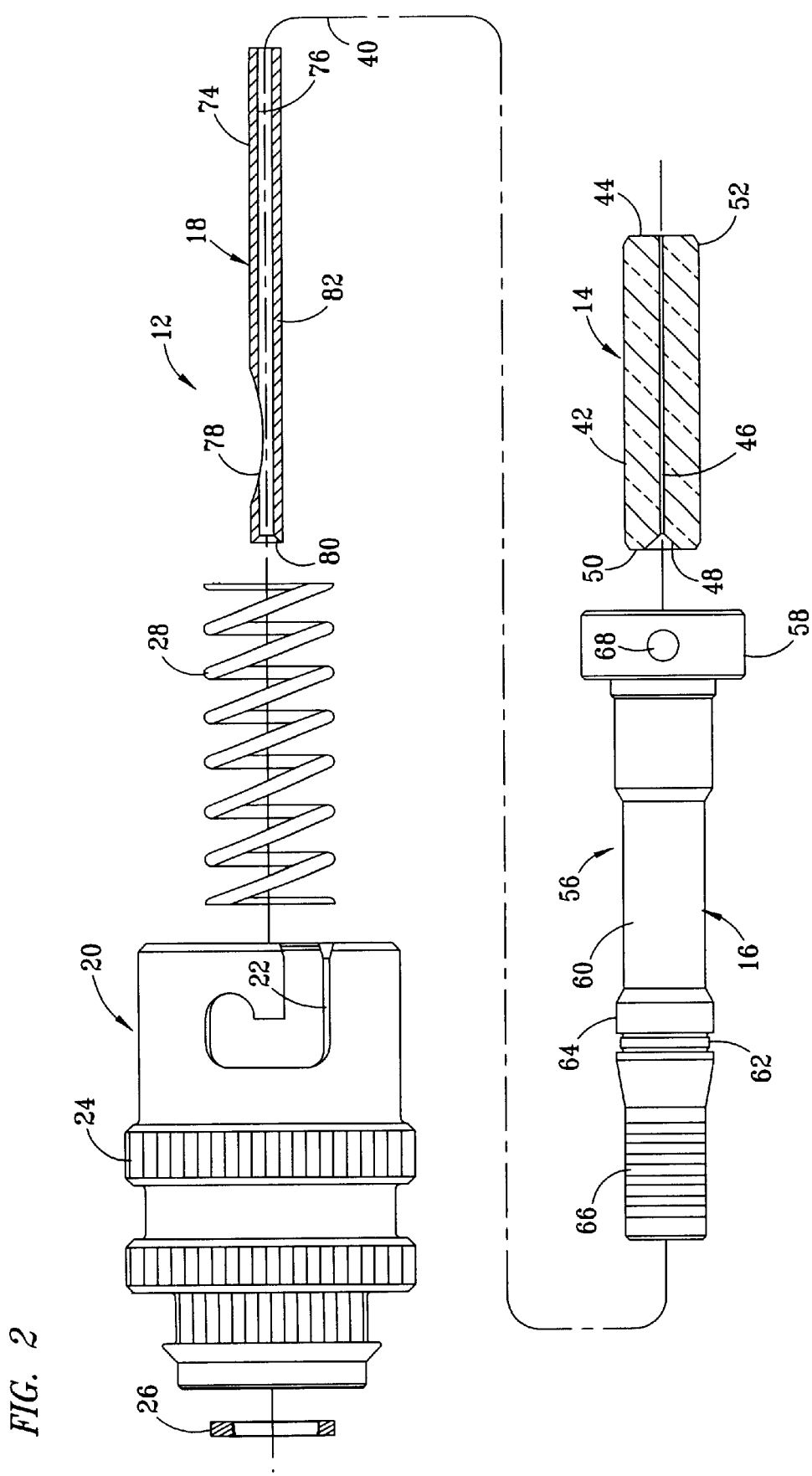
FIG. 2 is an exploded, side elevation view of the single terminus connector.

FIG. 2 is an exploded, side elevation view of the single terminus connector 12. The connector 12 has a longitudinal axis 40 about which the various components thereof are concentrically disposed when assembled together. The spring 28, the coupling sleeve 20 and the lock ring 26 preferably have interior profiles and exterior peripheries which are concentric with the longitudinal axis 40. The ferrule 14 has a cylindrical exterior periphery 42 and a forward flat, or planar, end face 44. A bore 46 extends through the ferrule 14, with the bore 46 and the exterior periphery 42 being concentric with the longitudinal axis 40. The bore 46 preferably is cylindrical and has an internal diameter which is slightly larger than the exterior diameter of the T-fiber 34 and the P-fiber 36. The ferrule 14 further has a tapered entrance 48 formed into the planar end face 50. The tapered entrance 48 provides a guide entrance for guiding the T-fiber 34 and the P-fiber 36 into the bore 46 during assembly. The exterior periphery 42 at the end faces 44 and 50 has chamferred edges 52.

The pin body 16 has an exterior periphery 56 which is stepped in size to have various outer diameters. Preferably, the exterior periphery is concentric with the longitudinal axis 40. An enlarged OD section 58 provides a head for the pin body 16, and a rearward facing shoulder for retaining the coupling sleeve 20 on the pin body 16. A narrowed section 60 of the periphery 56 extends at a intermediate section of the pin body 16. A groove 62 is formed into an enlarged portion 64 for receiving the snap ring 26. The periphery 56 further defines a barbed end section 66 which is used in other embodiments in combination with a sleeve and with jacketed optical fibers for securing aramid fiber strength members to the pin body 16. The large OD section 58 has an alignment pin 68 which is integrally molded with the pin body 16 and which extends perpendicular to the longitudinal axis 40. The pin body 16 further has an internal bore 70 (shown in FIG. 4) which is also concentric with the longitudinal axis 40.

The fiber guide tube 18 has a cylindrical outside periphery 74 and a cylindrical bore 76, which preferably are concentric with the longitudinal axis 40. The bore 76 is preferably of a size for passing the full outside diameter of the T-fiber 34, with the buffer coating still installed around the T-fiber 34. A window 78 is formed in a rearward end section of the periphery 74, and extends from the periphery 74, through the sidewall 82 of the tube 18 and into the bore 76 to provide an aperture for applying adhesive to the T-fibers 34 when installed to the connector 12. The rearward end of the fiber guide tube 18 has a tapered entrance 80, for guiding the T-fiber into the bore 76.

Figure 3:
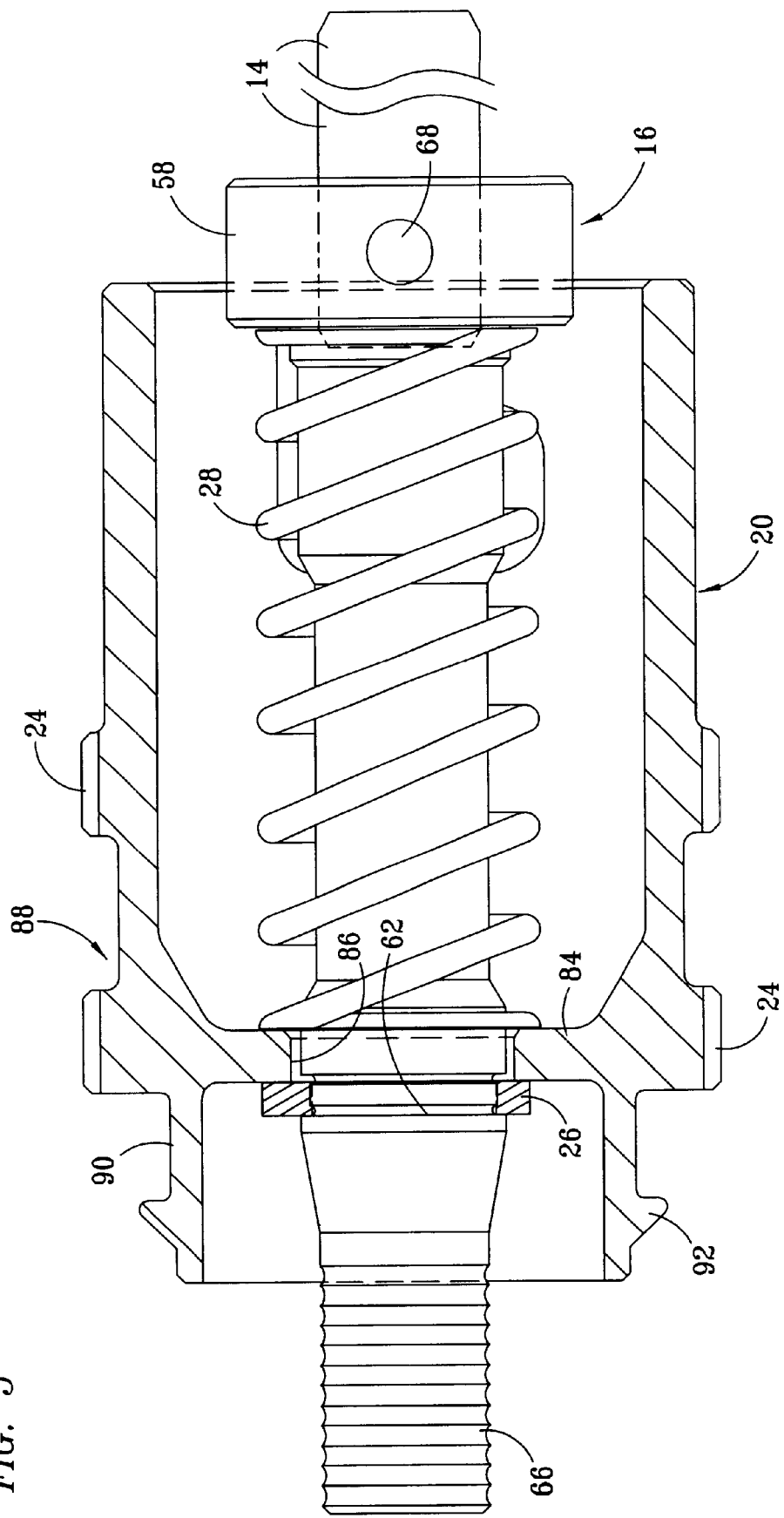
FIG. 3 is a cut away view of the single terminus connector.

FIG. 3 is a cut away view of the connector 12. The coupling sleeve 20 is shown mounted to the pin body 16. The coupling sleeve 20 has a reduced diameter section 84 with an aperture 86 which extends through the reduced diameter section 84. The aperture 86 has an inside diameter such that the lock ring 26 will retain the coupling sleeve 20 onto the pin body 16, retained between the head defined by the enlarged section 58 of the pin body 16 and the lock ring 26. The exterior periphery 88 of the coupling sleeve 20 has the knurled portions 24 and a reduced diameter portion 90. The reduced diameter portion 90 has a raised barb 92 which is tapered to an enlarged diameter in a forward direction.

Figure 4:
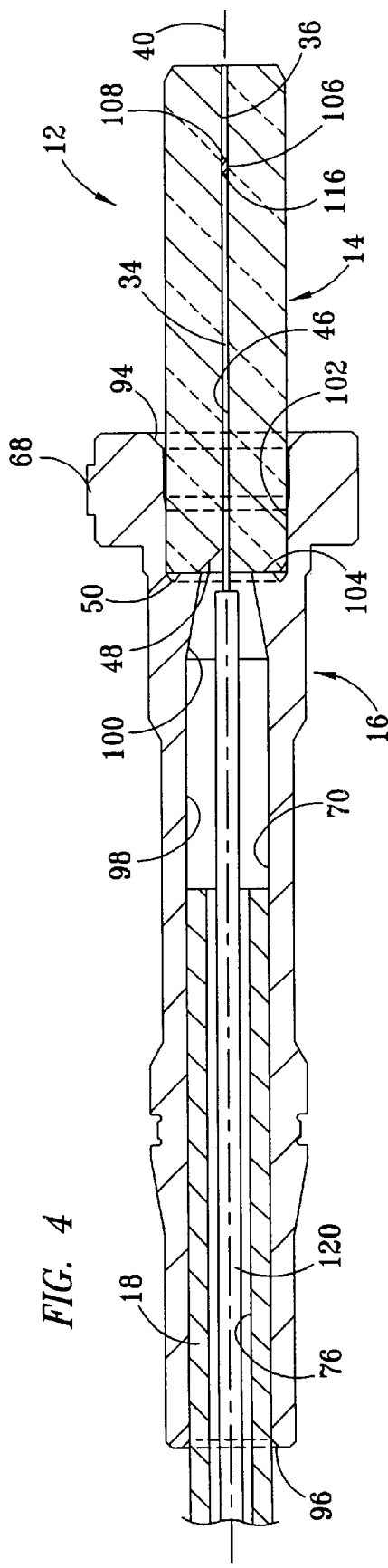
FIG. 4 is a longitudinal section view of the single terminus connector, taken along a section of line 4—4 of FIG. 1.

FIG. 4 is a longitudinal section view of the connector 12, taken along section line 4—4 of FIG. 1. The forward end of the bore 70 of the pin body 16 has a tapered entrance 94, and the rearward end of the bore 70 has a tapered entrance 96. The bore 70 has a region 98 which is tapered to a reduced diameter in an inward direction, extending from the rearward end toward the forward end, and defining a profile having a two degree taper. An intermediate portion of the bore 70 has a guide taper 100, which is preferably a twenty degree included taper, sidewall to sidewall across the internal diameter of the bore 70, that is, with each sidewall-of the bore 70 in the guide taper 100 having an internal taper often degrees in relation to the longitudinal axis 40. The guide taper 100 extends into a larger diameter bore 102, with a forward facing shoulder 104 extending therebetween. The shoulder 102 provides a stop for the rearward end face 50 of the ferrule 14. The guide taper 100 of the bore 70 tapers to guide the T-fiber 34 into the tapered entrance 48 of the ferrule 14, for guiding the T-fiber 34 into the bore 46 of the ferrule 14.

The guide tube 18 has the bore 78, which preferably is sized for passing the fiber 34, including the buffer coating 120 of the fiber 34. The tapered section 98 provides a stop means within which the guide tube 18 is secured within the pin body 16, by being wedged within the tapered section 98 of the bore 70. In other embodiments, shoulders and coupling sleeves, such as threaded coupling sleeves, snap rings, and the like, may be provided for securing the fiber guide tube 18 within the pin body 16.

Figure 5:
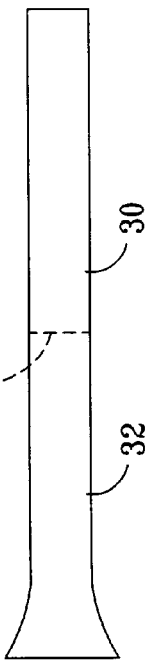
FIG. 5 is a side elevation view of a dust cover and bend relief tube.

FIG. 5 shows the strain relief tube 30 having an adjoining dust cover 32. The dust cover 32 is sealed. The dust cover 32 and the strain relief tube 30 are integrally formed, joined along the region depicted by the dotted line 38. Immediately prior to assembly, the dust cover 32 is separated from the strain relief tube 30 by being cut along the dotted line 38. The strain relief tube 30 is tubular having a central passage which runs the longitudinal length of the tube 30.

Figure 6:
FIGS. 6–11 are partial section views depicting various assembly steps for an optical fiber being preterminated in the ferrule.
Figure 7:
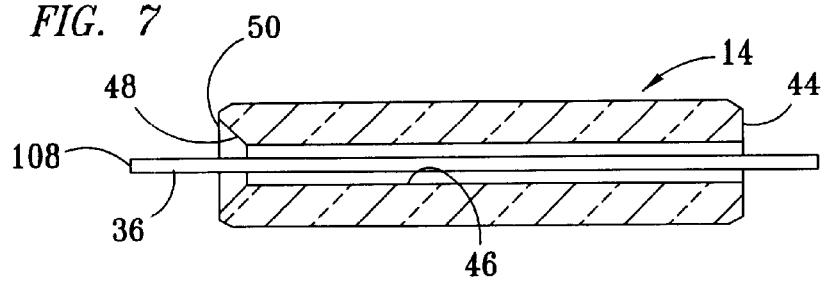

FIGS. 6–11 are sectional views of the ferrule 14 and side views of the P-fiber 36, which schematically depict factory pretermination of the P-fiber into the ferrule 14. Although FIGS. 7–19 depict a significant difference between the diameter of the bore 46 and the diameters of the T-fiber 34 and P-fiber 36, this difference in size is shown for illustrative purposes, and it should be noted that the fibers 34 and 36 preferably have fiber core diameters, after the buffer coatings are removed, of approximately 125.0 micrometers, and the diameter of the bore 46 of the ferrule 14 is preferably in a range of 126.0 to 129.0 micrometers. The ferrule 14 and the P-fiber 36 are preferably placed in respective assembly fixtures, such as that discussed below in reference to FIG. 20. A rearward section 107 is first cleaved from the P-fiber 36, as shown in FIG. 6. Preferably, a high precision cleaving tool of the type which is commonly used for assembly of optical fibers with fiber optic connectors is used for cutting the end of the P-fiber 36. Cleaving tools in which the optical fiber being cut is first clamped, scored and then broken off by the tool, to provide a substantially planar end face for the optical fiber. The P-fiber 36 is then inserted into the tapered guide entrance 48 of the rearward face 50 of the ferrule 14. The fiber 36 is pushed through the bore 46 until the fiber 36 extends from the forward end face of the ferrule 14 as shown in FIG. 7.

Figure 8:
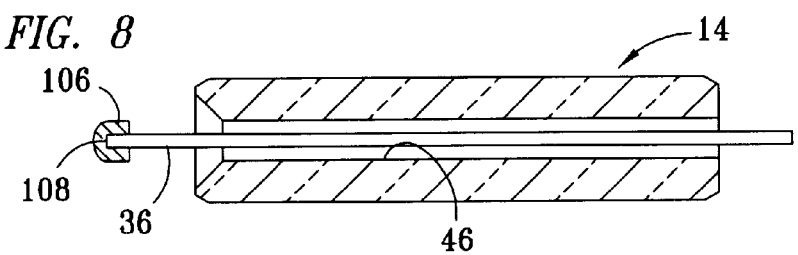
Figure 9:
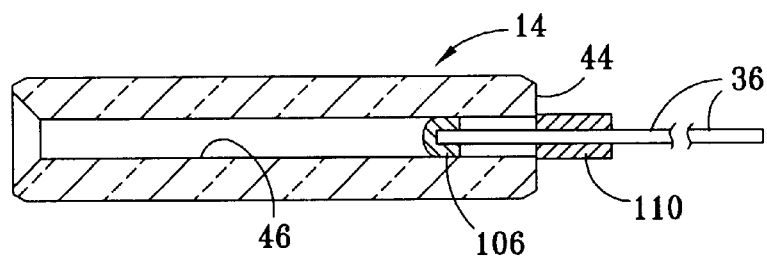
Figure 10:
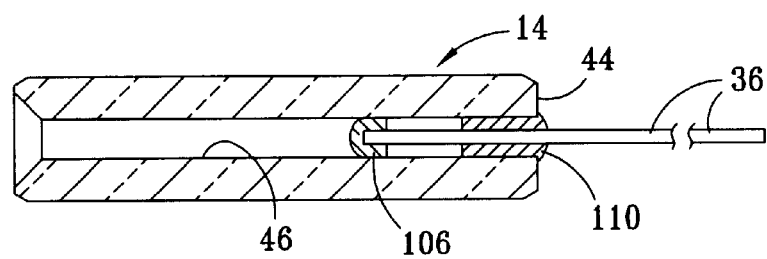

In FIG. 8, an index matching gel ("IM gel") 106 is applied to the rearward face 108 and portion of an end section of the exterior periphery of the P-fiber 36. The P-fiber 36 is then pulled into a forward position with a portion of the P-fiber 36 remaining within the ferrule 14, as shown in FIG. 9. Then, an adhesive 110 is applied to a portion of the periphery of the P-fiber 36 which is disposed adjacent to the forward face 44 of the ferrule 14. Preferably, a military approved epoxy adhesive is used for the adhesive 110, such as that available from Epoxy Technology Inc., of Billerica, Mass., under the trademark EPO-TEK®-353ND. Then, as shown in FIG. 10, the P-fiber 36 is pushed rearward and back into the bore 46, such that the adhesive 110 extends between the bore 46 of the ferrule 14 and the exterior periphery of the P-fiber 36. The P-fiber 36 will preferably extend into the bore 46 for a distance of approximately one and one-half millimeters, which will be final length of the P-fiber 36 after pretermination is complete.

Figure 11:
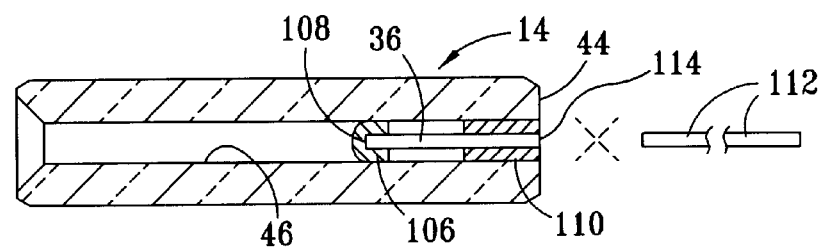

In FIG. 11, a forward end section 112 of the P-fiber 36 is removed, which extends forward of the forward face 44 of the ferrule 84. Then, the forward face 114 of the P-fiber 36 and the forward face 44 of the ferrule are prepolished to remove excess adhesive 110. The end face 108 of the P-fiber 36 faces rearward and has the IM gel 106 disposed thereon, with some of the IM gel 106 extending between an end section, or tip, of the rearward end portion of the P-fiber 36 and the interior diameter of the bore 46 of the ferrule 14.

FIGS. 12–16 are longitudinal section views showing various steps in assembly of the components of the connector 12. In FIG. 12, the ferrule 14 is mounted into the section 102 of the bore 70 of the pin body 16, and is both adhesively secured to and press fit within the pin body 16. The end face 50 of the ferrule 14 fits near the forward facing shoulder 104 defined between the tapered guide section 100 and the section 102 of the bore 70, such that preferably 0.305 to 0.315 inches of the ferrule 14 protrudes from the pin body 16. In FIG. 13, the spring 22 has been passed over the exterior end of the pin body 16 to engage the rearward facing shoulder defined by the enlarged section 58 of the periphery 56 of the pin body 16. Then, the coupling sleeve 20 is passed over the rearward end of the pin body 16, and the lock ring 26 is installed within the groove 62 to secure the coupling sleeve 20 to the pin body 16, with the spring 22 pushing the coupling sleeve 20 against the lock ring 26. FIG. 14 shows the fiber guide tube 18 after a portion of the IM gel 106 is placed in a forward portion of the bore 76 of the fiber guide tube 18. Then, in FIG. 15, the fiber guide tube 18 is inserted into the rearward end of the bore 70 of the pin body 16, and inserted into the tapered section 98 of the bore 70 until a forward section of the fiber guide tube is wedged within the pin body 16.

Figure 16:
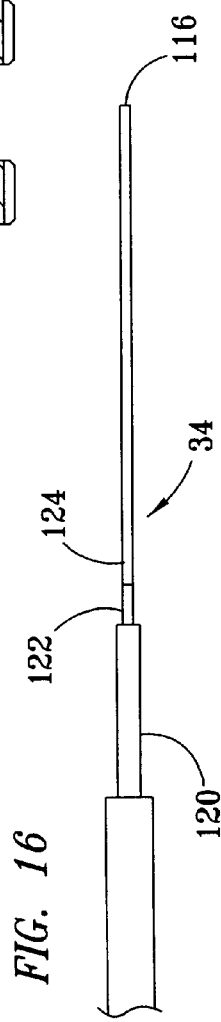
FIGS. 16–19 are longitudinal section views depicting assembly of the various components of the single terminus connector and a terminating optical fiber during field use.

FIGS. 16–19 are longitudinal section views which schematically depict various steps for installation of the T-fiber 34 into connector 12. In FIG. 16, the buffer coating 120 is stripped from the bare fiber 124 for a distance to allow insertion of the bare fiber 124 into the bore 46 of the ferrule, and then the end of the T-fiber 34 is cleaved to define a forward end face 116. Preferably, the end face 116 of the T-fiber will be cleaved to provide ten millimeters of the bare fiber 124. The IM gel 106 is preferably not applied to the end face 116 of the bare fiber 124 of the T-fiber 34 prior to insertion into the guide tube 18.

Figure 17:
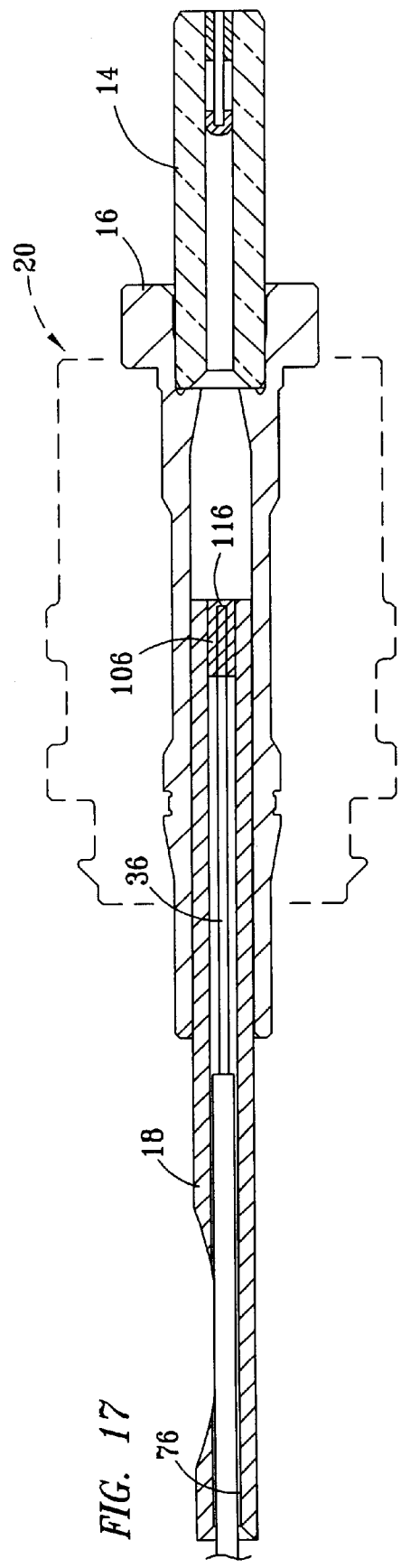

In FIG. 17, the T-fiber 34 is inserted through the guide tube 18 and engages the IM gel 106, such that the IM gel 106 is placed on the forward face 116 of the T-fiber 34. As the forward end portion of the T-fiber 34 passes through the IM gel 106 in the fiber guide tube 18, the IM gel 106 will also be placed around a portion of the outer periphery of the bare fiber 124 which is adjacent to the end face 116 of the T-fiber 34.

Figure 18:
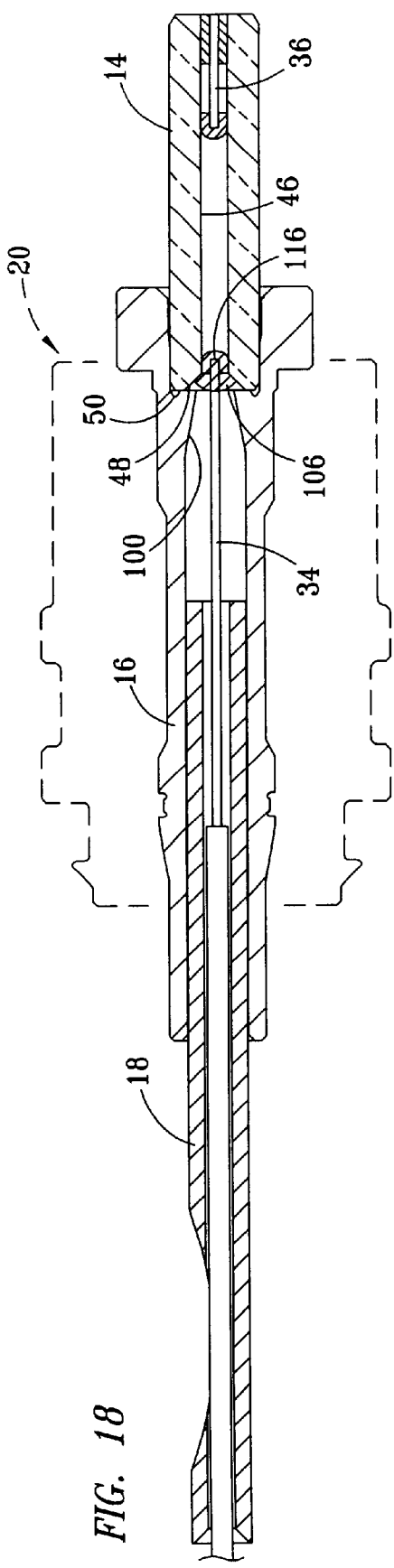

In FIG. 18, the end face 116 of the T-fiber 34 is passed into the rearward entrance section 100 of the bore 70 of the pin body 16, and then passed into tapered entrance 48 of the ferrule 14. As the forward face 116 of the T-fiber 34 passes into the bore 46 of the ferrule 14, a portion of the IM gel 106 disposed on the exterior periphery of the T-fiber 34 will be wiped from the exterior surface of the periphery of the outer circumference of fiber 34 by engaging the tapered entrance 48 into the bore 46 of the ferrule 14. Removal of a portion of the IM gel 106 from the exterior periphery of the T-fiber 34 provides an air passage to allow air to escape from the bore 46 of the ferrule 14, from between the T-fiber 34 and the P-fiber 36, such that the IM gel 106 can extend fully between the forward face 116 of the T-fiber 34 and the rearward face 108 of the P-fiber 36.

Figure 19:
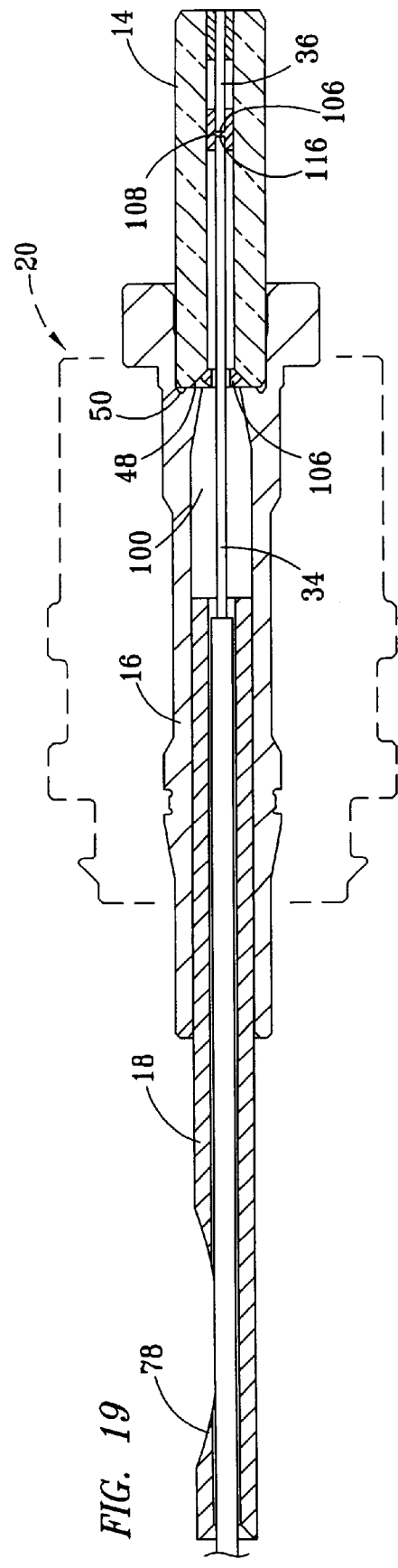

In FIG. 19, the T-fiber is depicted as being fully inserted within the bore 46 of the ferrule 14, with the IM gel 106 extending fully between and directly contacting the faces 116 and 108 to optically couple the T-fiber 34 to the P-fiber 36. An adhesive 37 is installed through the window 78 of the fiber guide tube 18 to adhesively secure the T-fiber within the connector 12, as shown in FIG. 1. Pressure is held on the T-fiber 34, preferably using the tooling discussed below in reference to FIG. 21, as the adhesive 37 is applied and cures. Preferably, cyanoacrylate adhesive is used for the adhesive 37, such as that available from Lord Corporation, of Erie Pa., having Part No. CA8300 and which will set quickly as compared to prior art epoxy adhesives. Pressure will be held upon the T-fiber 34, such that the IM gel will later extend fully, or continuously, between and directly contact both of the faces 116 and 118 of the T-fiber 34 and the P-fiber 36, respectively, to optically connect the T-fiber 34 to the P-fiber 36.

Figure 20:
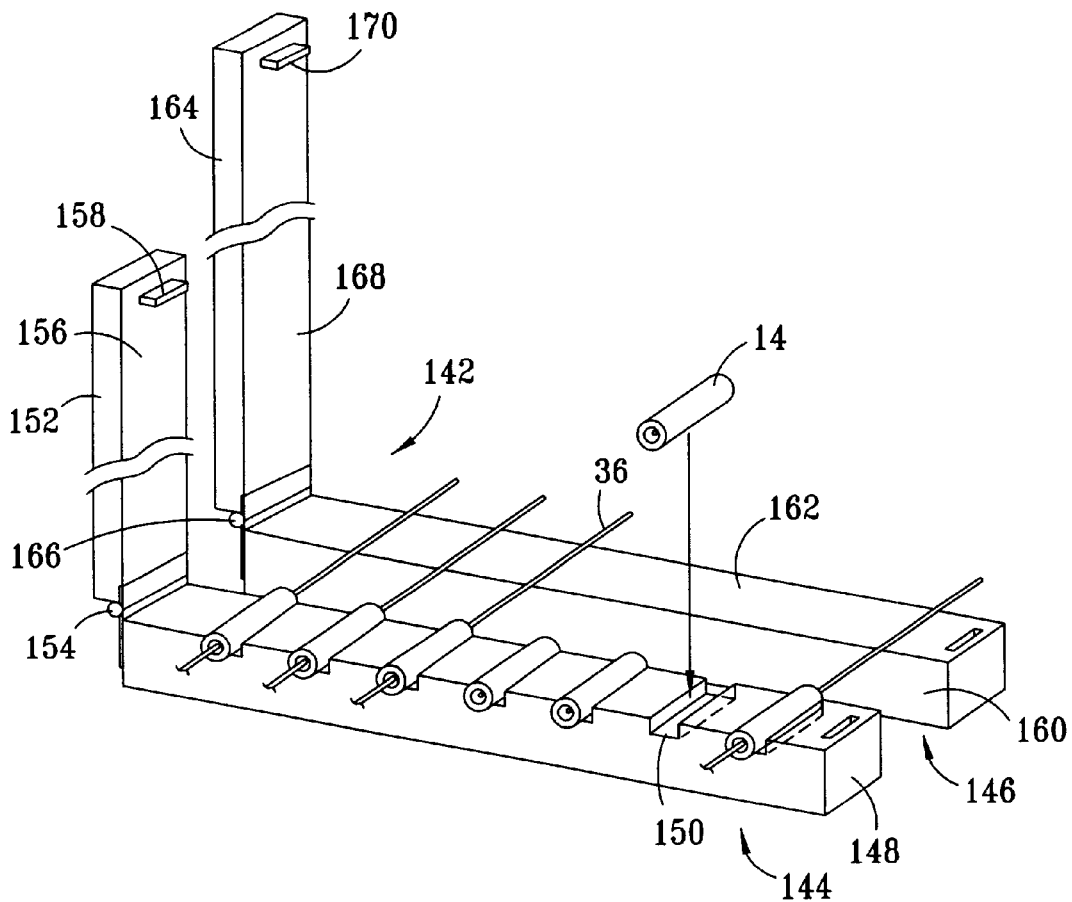
FIG. 20 is a perspective view of assembly fixturing for installing the preterminated fiber within the ferrule of the single terminus connector.

FIG. 20 is a perspective view which schematically depicts assembly fixtures 142 for assembling the P-fiber 36 into the ferrules 14 according to the present invention. The fixturing 142 includes a first fixture 144 for securing the ferrule and a second fixture 146 within which the P-fibers are secured. The first fixture 144 includes a base 148, and grooves 158 which provide slots within which respective ones of the ferrules 14 are secured. A clamp 152 is pivotally secured to the base 148 by a hinge 144, and has a rubber, or elastomeric, lower surface 156. A latch 158 is provided for securing the clamp 152 to the base 158 with the ferrules 14 secured therein. The second fixture 146 includes a base 160 having a flat, or planar, surface 162 for receiving various ones of the P-fibers 36. The second fixture 146 further includes a clamp 164 which is pivotally connected to the base 160 and has an elastomeric lower surface 168. The clamp 164 is secured in place against the base 160 for securing the P-fibers 36 therein by a latch 170. Other embodiments of the clamps 152 and 168 may include vertical descending or forward hinged clamps, any other clamp device, adhesive tape or friction tape, which securely holds the ferrules 14 and the fibers 36 in position on the bases 148 and 160, respectively.

Figure 21:
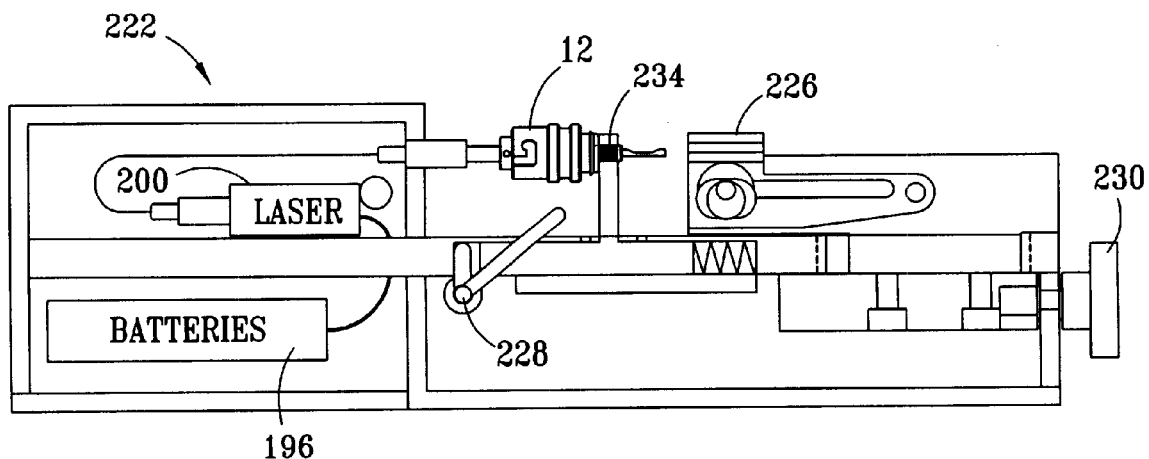
FIG. 21 is a side elevation view of tooling for mounting the assembly fixtures for installing a terminating fiber within the single terminus connector.

FIG. 21 is a side elevation view which schematically depicts tooling 222 for connecting and securing the T-fiber 34 to the rearward end of the single terminus connector 12. A light source 200 is connected to the fixture 232 by an optical fiber 198 to provide an active light source which is connected to the preterminated fibers 36 when the connectors 12 are installed in the fixture 232. Preferably, the light source 200 is a visible light source, such that a visible indication is provided by light which is emitted directly from the ferrules 14 as the T-fibers 34 are being installed within the connectors 12 to make up with the P-fibers 36, to which the light source 200 is preferably connected. A fixture 234 provides a bias means for securing the connector 12 in position against the fixture 232 to maintain the optical coupling while the T-fiber 34 is assembled into the connector 12. A hand lever 228 is provided to open and close the fixture 234. A fixture 226 fixedly secures the T-fibers for assembly into the connector 12. The tool 222 controls relative positioning and relative movement of respective ones of the assembly fixtures 232 and 226 for assembly of the connector 12 and insertion of the T-fiber 34 within the connector 12. An adjust means 230 is provided for adjusting the separation between the first fixture 232 and the second fixture 226, controlling movement of the second fixture 226 parallel to the central, longitudinal axis of the tool 222. The tooling 222 will also preferably include a cleaving tool, for cleaving the end of the T-fiber 34.

Figure 22A:
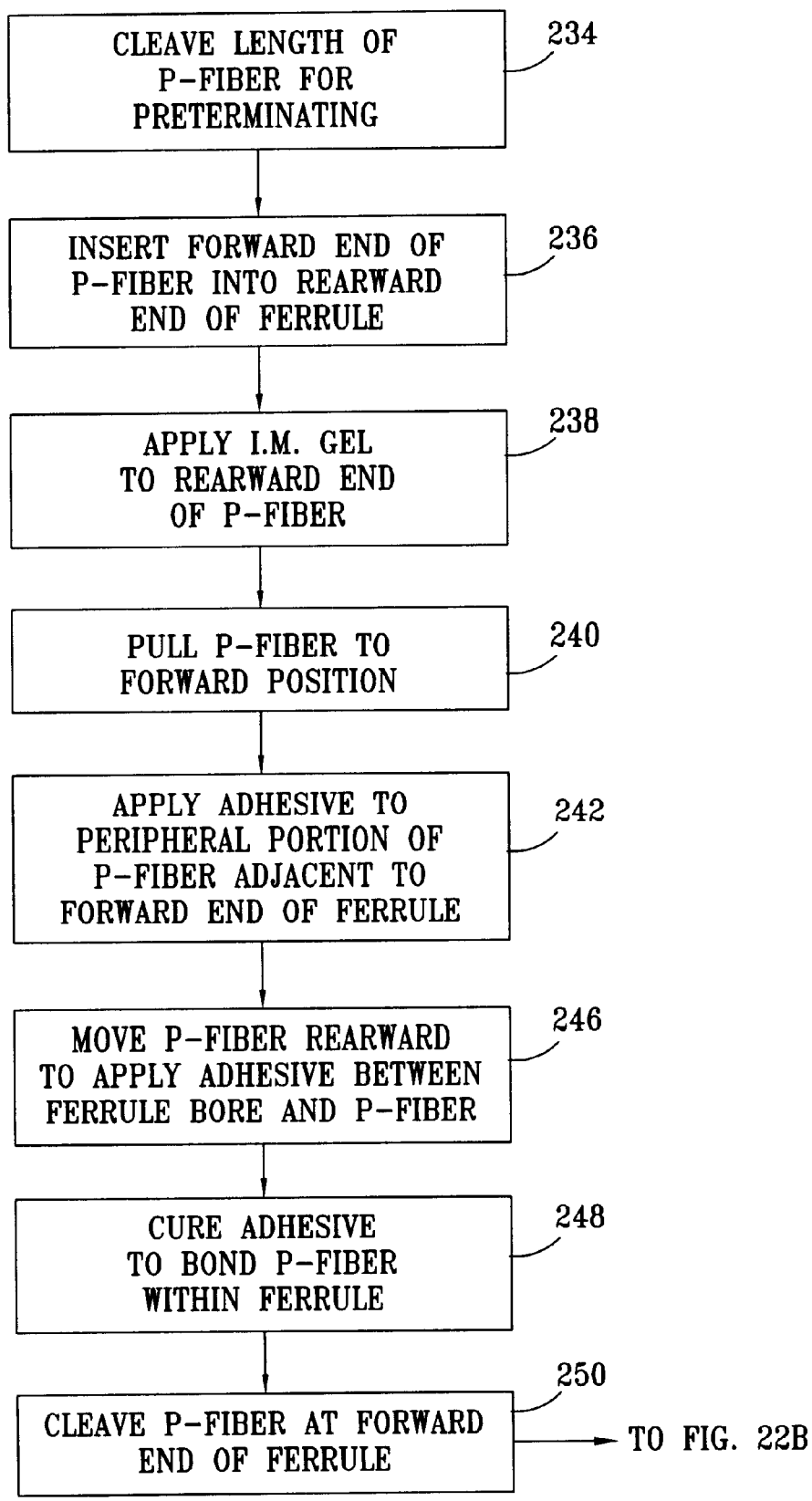
FIGS. 22A and 22B are flow charts which depict the various steps for a method of assembling the various components of the single terminus connector.
Figure 22B:
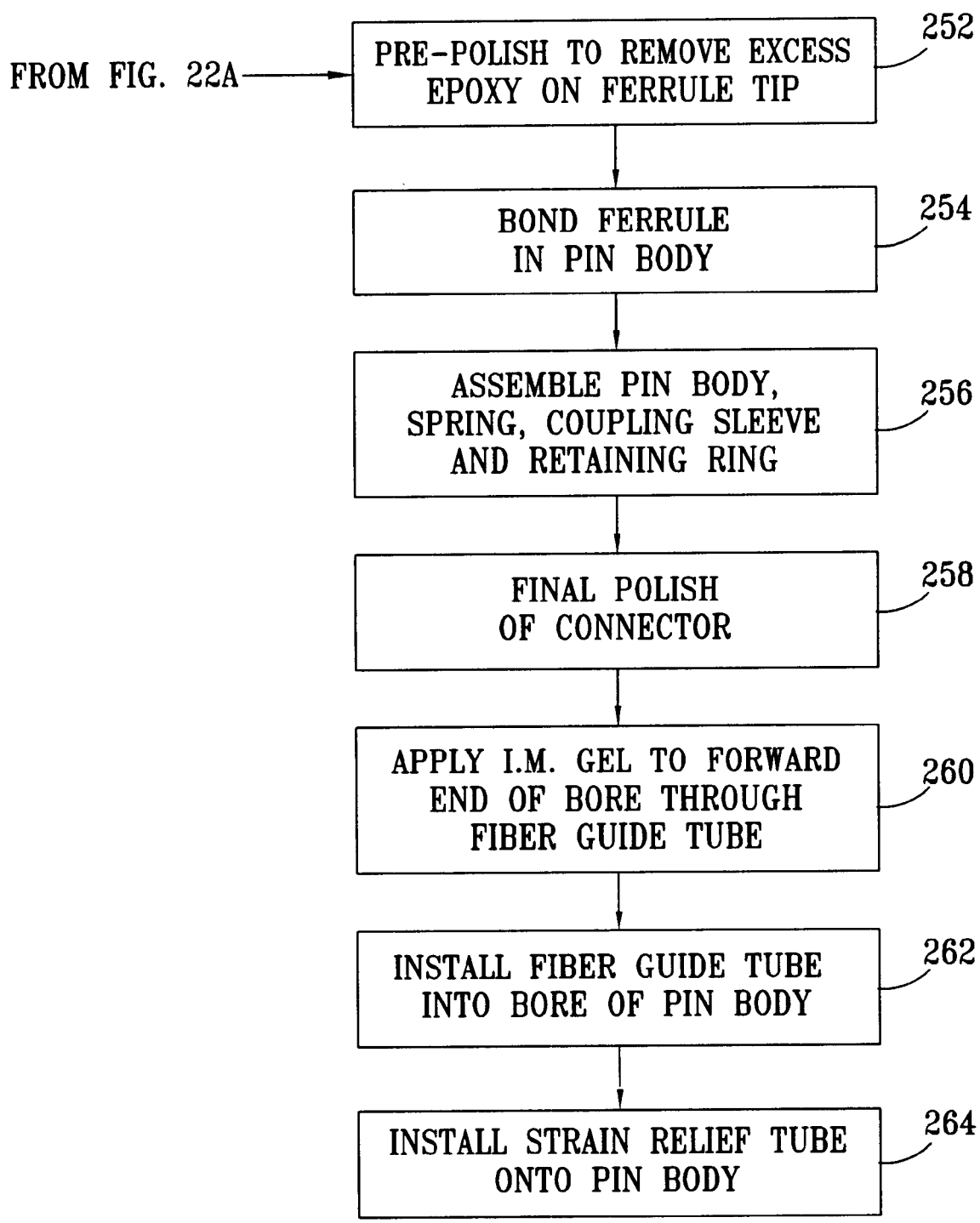

FIGS. 22A and 22B are flow charts depicting assembly of the single terminus connector 12. Block 234 depicts cleaving a first end of the P-fiber 36 for preterminating within the ferrule 14, as shown in FIG. 6. Block 236 depicts the step of inserting the forward end of the P-fiber 36 into the rear-end of the ferrule 14, as shown in FIG. 7. The block 238 depicts the step of applying the index matching gel 106 to the rearward end face of the P-fiber 36, as shown FIG. 8. Block 240 depicts the step of pulling the P-fiber 36 to the forward position depicted in FIG. 9. Block 242 depicts the step of applying the adhesive to the peripheral portion of the P-fiber 36 adjacent to the forward end face 44 of the ferrule 14, as depicted in FIG. 9. Block 246 depicts the step of moving the P-fiber 36 rearward to the position shown in FIG. 10, to apply the adhesive 110 between the bore 46 of the ferrule 14 and the P-fiber 36, such that the P-fiber 36 preferably extends into the ferrule 14 for one and one-half millimeters. Block 248 depicts the step of curing the adhesive 110 to bond the P-fiber 36 within the bore 46 of the ferrule 14, with the P-fiber remaining fixedly secured in the position shown in FIG. 10. Block 250 depicts the step of cleaving the forward end portion 112 of the P-fiber 36 therefrom, at the forward end face 44 of the ferrule 14, as shown in FIG. 11. Block 252 depicts the step of removing any excess epoxy on the ferrule tip by prepolishing the forward end of the ferrule faced 44, as shown in FIG. 11. The steps depicted in blocks 234 through 250 may be accomplished using the fixturing 142 of FIG. 19.

Figure 15:
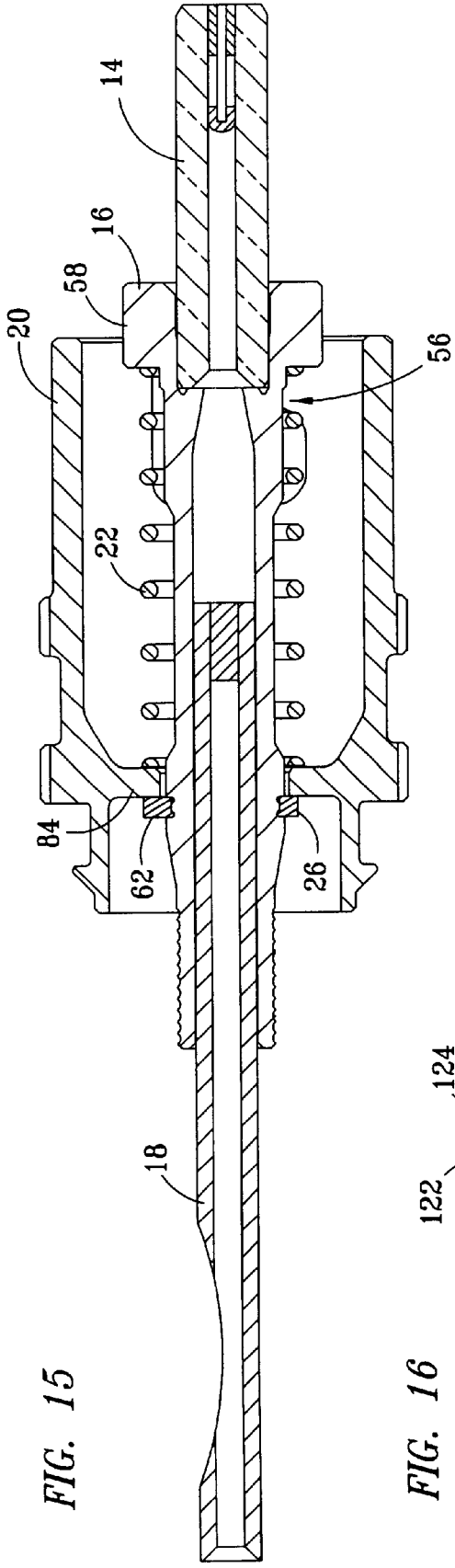

Block 254 depicts the step of bonding the ferrule 14 in the forward end of the pin body 16, as depicted in FIG. 12. Block 256 depicts the step of assembling the pin body 16, the coupling sleeve 24, the spring 28, and the retaining ring 26, as shown in FIG. 13. Block 260 depicts the step of applying the index matching gel 106 to the forward end of the bore 76 through the fiber guide tube 18, as shown in FIG. 14. Block 262 depicts the step of installing the fiber guide tube 18 into the bore 70 of the pin body 16, as shown in FIG. 15.

Figure 23A:
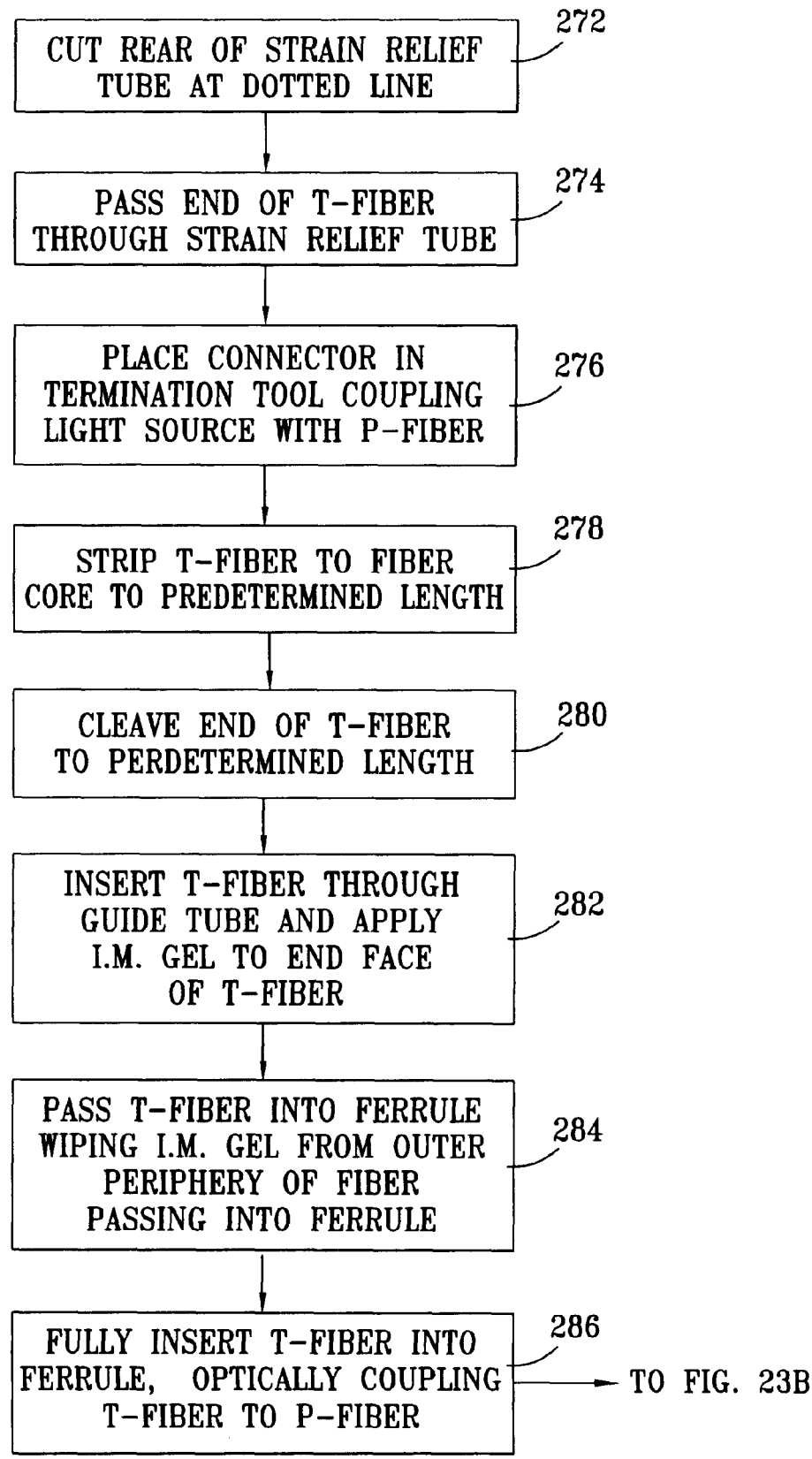
FIGS. 23A and 23B are flow charts which depict the various steps for a method of installing a terminating fiber within the single terminus connector to optically couple the terminating fiber to a preterminated fiber within the single terminus connector.
Figure 23B:
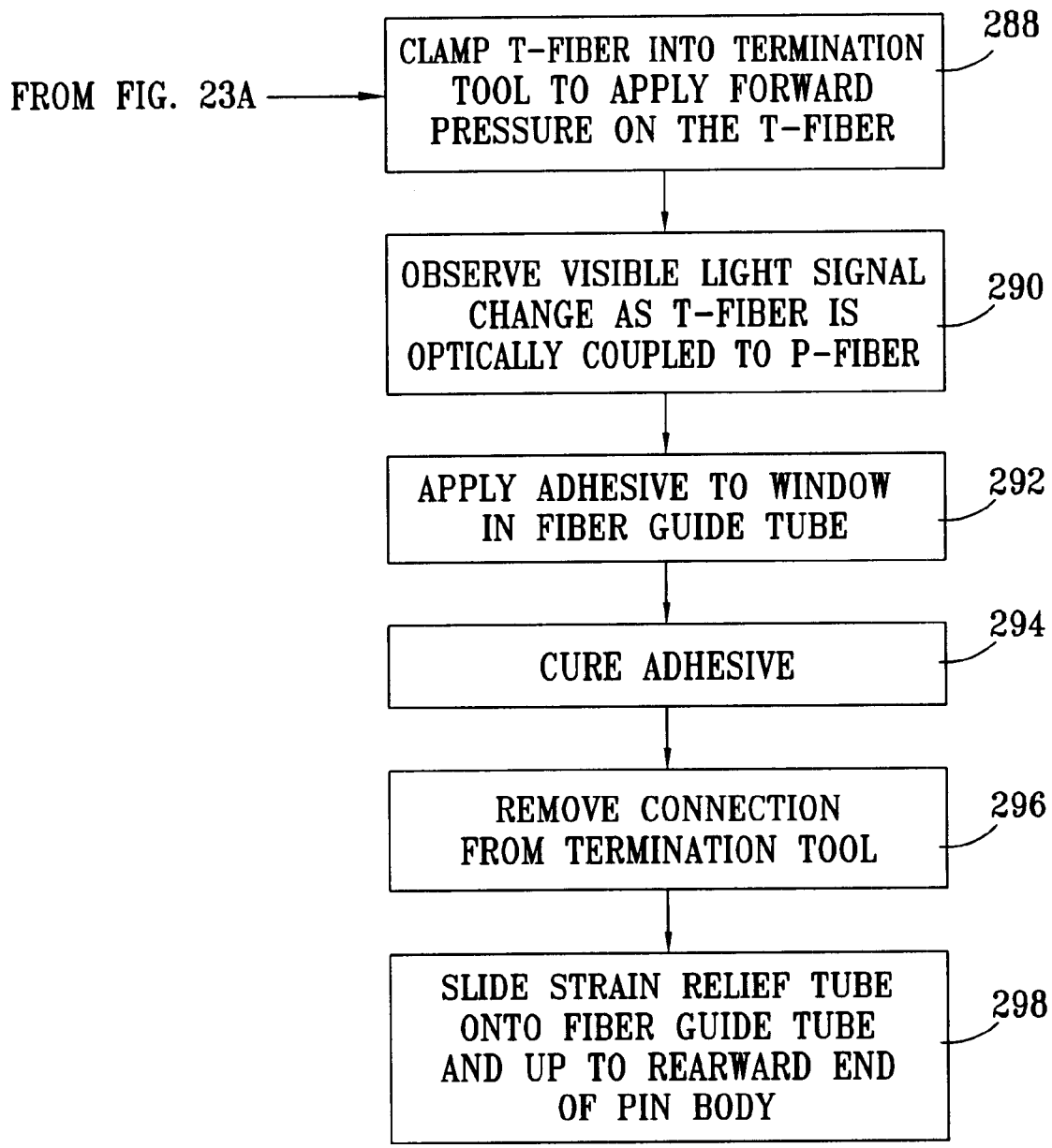

FIGS. 23A and 23B depict the method for terminating a T-fiber 34 into the connector 12 according to the present invention. Block 272 depicts the step of cutting the strain relief tube 30 along the dotted line 38 to separate the sealed dust cover portion 32 from the tubular, strain relief portion 30, shown in FIG. 5. Block 274 depicts a step of passing the T-fiber 34 through the strain relief tube 30. Block 276 depicts the step of placing the connector 12 in the termination tool such that the light source 200 is optically coupled to the P-fiber 36 through the fixture 242 of the terminating tool 222, as shown in FIG. 21. Block 278 depicts the step of stripping the T-fiber 34 to the fiber core 124 of a predetermined length for fitting within the tooling, and block 280 depicts the step of cleaving the end of the T-fiber to the predetermined length of preferably ten millimeters, as shown in FIG. 16. Block 282 depicts the step of inserting the T-fiber 34 through the fiber guide tube 18 which applies the index matching gel 106 to the forward face 116 of the T-fiber 34, as shown in FIG. 17. Block 284 depicts the step of passing the T-fiber 34 into the ferrule 14, wiping the index matching gel 106 from the periphery of the bare portion 124 of the T-fiber 34 as the T- fiber 34 is passed into the tapered entrance section 48 of the bore 46 of the ferrule, as shown in FIG. 18. Block 286 depicts the step of inserting the T-fiber into the ferrule 14, for optically coupling the T-fiber 34 to the P-fiber 36, as shown in FIG. 19.

Block 288 depicts the step of applying pressure to the T-fiber 34 with the termination tool 222 of FIG. 21 to apply forward pressure onto the T-fiber 34, such that the IM gel 106 on the forward end face 116 of the T-fiber 34 fully contacts the IM gel 106 on the rearward face 108 of the P-fiber 36, to extend fully, or continuously, between two faces 116 and 108 to optically couple the T-fiber 34 to the P-fiber 36. Block 290 depicts the step of observing visible light signal changes at the portion of the ferrule which is next to the rearward face 108 of the P-fiber 36, as the T-fiber 34 is optically connected to the P-fiber 36. The light changes indicate that the index matching gel 106 is fully extending between the faces 116 and 108 optically couple the T-fiber 34 to the P-fiber 36. By connecting a small active light device 200 (shown in FIG. 21) to the forward face 114 (shown in FIG. 11) of the P-fiber 36, verification of a proper connection is indicated by the portion of the ferrule 14 located adjacent to the end face 108 of the P-fiber 36 glowing with a color according to the color of the light emitted by the device 200, such as a bright red for a red wavelength light device, and then the glowing will cease once the T-fiber 34 is optically connected to the P-fiber 36. This visible change in the light signal is observed to provide positive verification during field assembly that at proper optical connection is made.

Block 292 depicts the step of applying the adhesive 37 into the window 78 of the fiber guide tube 18, as shown in FIG. 1. Block 294 depicts the step of curing the adhesive 110 to secure the T-fiber 34 within the fiber guide tube 18, optically connected to the P-fiber 36. Block 296 depicts the step of removing the connection 12 and the T-fiber 34 from the termination tool 222. Block 298 depicts the step of securing the strain relief tube 30 over the fiber guide tube and up to the rearward end 66 of the pin body 16 to complete installation of the terminating fiber 34 into the single terminus connection 12, optically coupled to the preterminated fiber 36.

The various components of the single terminus connector 12 may be formed of various materials. Connectors made according to the present invention may be formed of various materials, and may also be provided for connecting multiple termini rather than a single terminus. Preferably, the ferrule 14 is formed of a ceramic, such as zirconia. The pin body 16 and the coupling sleeve 20 are formed of No. 17-4 MIM stainless steel, which is injection molded. The fiber guide tube 18 is formed of 304L stainless steel. The spring 28 is formed of T316 stainless steel. In the preferred embodiment, the connector 12 is sized for connecting T-fibers 34 and P-fibers 36 which are 250 micrometers in diameter across the buffer coating, and 125 micrometers in diameter across the bare fibers. Connectors made according to the present invention may also connect other sizes of fibers, buffers and fiber jackets.

The present invention provides several advantages over prior art connectors having preterminated fibers in ferrules thereof for mating with terminating fibers in the field. An index matching gel is provided for optically coupling the terminating fiber to the preterminated fiber. A fiber guide tube extends into a pin body for guiding the terminating fiber up to and into the ferrule 14 in the forward end of the pin body 16. A bore of the fiber guide tube has the index matching gel disposed in a portion thereof for applying the index matching gel to the forward face of the terminating fiber. The rearward end of the ferrule is configured in relation to the fiber guide tube and the terminating fiber such that any significant portions of the index matching gel is removed from the periphery of the terminating fiber, such that air will not become trapped between the rearward end face of the preterminated fiber and the forward end face of the terminating fiber to allow the index matching gel to optically couple the terminating fiber to the preterminated fiber. A window is provided in the fiber guide tube for adhesively securing the terminating fiber in position within the connector, such that a predetermined amount of internal pressure is provided to optically secure the terminating fiber into position for coupling to the preterminated fiber. The adhesive used for securing the terminating fiber in the connector is a preferably a quick-set type of adhesive, having a reduced curing time over that of typical epoxy adhesives, which along with feature of the preterminated fiber not requiring field polishing, reduces the field assembly time for the connector. An light signal is applied to the preterminated fiber as the terminating fiber is being connected to the preterminated fiber, to provide a positive indication which verifies when the two fibers are optically connected.

Although the preferred embodiment has been described in detail, it should be understood that various changes, substitutions and alterations can be made therein without departing from the spirit and scope of the invention as defined by the appended claims.

What is claimed is:

1. A fiber optic connector comprising:
   a ferrule having a ferrule bore extending therethrough;
   a pin body having a pin body bore extending therethrough;
   a preterminated fiber disposed in the forward end of the ferrule bore, adhesively secured therein;
   an index matching gel disposed in the rearward face of the preterminated fiber;
   a fiber guide tube having the index matching gel disposed in a portion thereof, the guide bore being sized for a terminating fiber therethrough, such that a portion of the index matching gel disposed within the guide bore thereof will be applied to the forward face of the terminating fiber; and
   an entrance section for guiding the terminating fiber into the rearward end portion of the ferrule bore, such that any significant portion on at least one side of the periphery of the terminating fiber will be removed therefrom to allow the index matching gel to optically couple the forward face of the terminating fiber to the rearward face of the preterminated fiber.

2. The connector according to claim 1, further comprising a window disposed in the side of the fiber guide tube for applying adhesive to adhesively secure the terminating fiber within the fiber guide tube.

3. A method for optically coupling a terminating fiber to a preterminated fiber, comprising the steps of:
   providing a pin body with a ferrule secured in the forward end thereof, the ferrule having a preterminated fiber disposed within a ferrule bore, wherein the preterminated fiber is adhesively secured within the ferrule bore and index matching gel is disposed on the rearward end face of the preterminated fiber;
   stripping a predetermined length of the buffer coating from a terminating fiber;
   cleaving the forward the end of the terminating fiber to define a end face of the terminating fiber;
   passing the terminating fiber through a guide tube having a portion of the index matching gel disposed within a bore thereof, such that at least part of the portion of the index matching gel is disposed on the forward end face of the terminating fiber;
   passing the forward end face of the terminating fiber into a rearward end of a bore of the ferrule, such that a significant portion of the index matching gel is wiped off at least a portion of the periphery of the forward end of the terminating fiber;
   passing the end face of the terminating fiber fully into the bore of the ferrule, such that the index matching gel extends between the forward end face of the terminating fiber and the rearward end face of the terminating fiber; and
   holding pressure on a portion of the terminating fiber to press the forward end face against the rearward end face, and then applying an adhesive through a window in the guide tube to adhesively secure the preterminated fiber into position, optically coupled to the preterminated fiber.

4. The method according to claim 3, comprising applying a visual light signal to the preterminated fiber as the terminating fiber is being connected to the preterminated fiber, and then observing a changed in the visual light signal when the terminating fiber is optically connected to the preterminated fiber.

5. A method for preterminating a P-fiber in a ferrule of a fiber optic connector and assembling the fiber optic connector, comprising the steps of:
   cleaving a length of the P-fiber for preterminating within the ferrule;
   inserting the forward end of the P-fiber into the rearward end of the ferrule;
   applying I.M. gel to the rearward end of the P-fiber;
   pulling the P-fiber to a forward position;
   applying adhesive to the peripheral portion of the P-fiber adjacent to the forward end of the ferrule;
   moving the P-fiber rearward to apply adhesive between the ferrule bore and the P-fiber;

curing adhesive to bond P-fiber within the ferrule;

cleaving the P-fiber at the forward end of the ferrule;

pre-polishing to remove excess epoxy on ferrule tip;

bonding the ferrule in a pin body;

assembling the pin body, spring, coupling sleeve and retaining ring;

final polishing of connector;

applying I.M. gel to forward end of bore through the fiber guide tube;

installing the fiber guide tube into the bore of the pin body; and installing strain relief tube onto the pin body.

6. A method for terminating a T-fiber within a fiber optic connector assembled according to the method of claim 5, comprising the steps of:

cutting the rear of the strain relief tube at the dotted line;

passing the end of the T-fiber through the strain relief tube;

placing the connector in the termination tool coupling light source with P-fiber;

stripping the T-fiber to fiber core to a predetermined length;

cleaving the end of T-fiber to a predetermined length;

inserting the T-fiber through the guide tube and applying I.M. gel to the end face of the T-fiber;

passing the T-fiber into the ferrule wiping I.M. gel from the outer periphery of fiber passing into the ferrule;

fully inserting the T-fiber into the ferrule, optically coupling the T-fiber to P-fiber;

clamping the T-fiber into the termination tool to apply forward pressure on the T-fiber;

observing a visible light signal change as the T-fiber is optically coupled to the P-fiber;

applying adhesive to a window in the fiber guide tube;

curing the adhesive;

removing the connection from the termination tool; and sliding the strain relief tube onto the fiber guide tube and up to the rearward end of the pin body.

\* \* \* \* \*